United States Patent
Kuwata et al.

(10) Patent No.: US 6,984,191 B2
(45) Date of Patent: Jan. 10, 2006

(54) RANGE DETERMINATION APPARATUS, RANGE DETERMINATION METHOD, AND PROGRAM THEREFOR

(75) Inventors: Masayuki Kuwata, Anjo (JP); Masayuki Tsugawa, Anjo (JP); Mitsunori Nakane, Anjo (JP); Kaoru Ootsuki, Anjo (JP); Masao Saitou, Anjo (JP); Kenji Suzuki, Anjo (JP)

(73) Assignee: Aisin AW Co., LTD, (JP)

( * ) Notice: Subject to any disclaimer, the term of this patent is extended or adjusted under 35 U.S.C. 154(b) by 94 days.

(21) Appl. No.: 10/739,403

(22) Filed: Dec. 19, 2003

(65) Prior Publication Data

US 2004/0186646 A1 Sep. 23, 2004

(30) Foreign Application Priority Data

Dec. 27, 2002 (JP) ............................ 2002-381435
Apr. 28, 2003 (JP) ............................ 2003-123899

(51) Int. Cl.
*F16H 59/60* (2006.01)
*F16H 59/00* (2006.01)
*B60Q 1/00* (2006.01)

(52) U.S. Cl. ........................ 477/97; 74/335; 340/456

(58) Field of Classification Search .................. 477/34, 477/97–99; 74/335, 473.1, 473.12; 701/51, 701/64; 340/456
See application file for complete search history.

(56) References Cited

U.S. PATENT DOCUMENTS

| 4,914,594 A | | 4/1990 | Sano ....................... 364/424.1 |
| 5,561,416 A | * | 10/1996 | Marshall et al. ............. 340/456 |
| 6,021,368 A | * | 2/2000 | Taniguchi et al. ............. 477/34 |
| 6,205,874 B1 | * | 3/2001 | Kupper et al. ................ 74/335 |
| 6,376,929 B1 | * | 4/2002 | Nakajima .................... 340/456 |
| 6,550,351 B1 | * | 4/2003 | O'Reilly et al. .............. 74/335 |
| 2002/0189381 A1 | * | 12/2002 | Kliemannel et al. .......... 74/335 |
| 2004/0079181 A1 | * | 4/2004 | von Haeften ................ 74/335 |

* cited by examiner

*Primary Examiner*—Roger Pang
(74) *Attorney, Agent, or Firm*—Bacon & Thomas

(57) ABSTRACT

A sensor generates a continuous signal in response to operation of a shift lever, and a range is determined for each of the various control operations by comparing the output value of the signal with a range determination pattern set arbitrarily for each of the control operations. Accordingly, each of the control operations can be performed appropriately by using optimal range information.

25 Claims, 9 Drawing Sheets

RANGE DETERMINATION APPARATUS, RANGE DETERMINATION METHOD, AND PROGRAM THEREFOR

INCORPORATION BY REFERENCE

The disclosure of Japanese Patent Application No. 2003-123899 filed on Apr. 28, 2003, including the specification, drawings, and abstract is incorporated herein by reference in its entirety.

CROSS-REFERENCE TO RELATED APPLICATION

This application claims, under 35 USC 119, priority of Japanese Application No. 2003-123899 filed Apr. 28, 2003.

BACKGROUND OF THE INVENTION

1. Field of the Invention

The present invention relates to a range determination apparatus, a range determination method, and a program there for.

2. Description of the Related Art

In a conventional vehicle in which a gear ratio is changed by a transmission, for example, an automatic transmission such as a staged automatic transmission, a continuously variable transmission (CVT) or the like, responsive to range selection by operation of a shift lever, an automatic transmission control unit (ECU) switches a solenoid or the like on or off in accordance with a gearshift logic for the selected range and thereby controls gearshift of the transmission. For this purpose, the automatic transmission is provided with a range determination apparatus that receives an output signal from a sensor, determines a range on the basis of the output signal, and determines the selected range.

The sensor mentioned above may be a contact-type sensor having a movable-side terminal and a plurality of fixed-side terminals. The movable-side terminal is attached to a manual shaft that is turned by operation of the shift lever. The fixed-side terminals, with which the movable side terminal is in contact, are attached to a sensor case and provide sliding contact upon turning of the manual shaft. With this contact-type sensor, when the shift lever is operated to select a range, the movable-side terminal is turned via the manual shaft in accordance with the turning angle of the shift lever, whereby the pattern of contact between the movable-side terminal and the fixed-side terminals is changed. This causes a change in resistance in the electric circuit including the movable-side terminal and the fixed-side terminals. In accordance with this change in the contact pattern, the sensor generates an output signal corresponding to the turning angle of the manual shift, which output signal is either a voltage value or a current value.

Upon receiving the output signal from the contact-type sensor, the range determination apparatus compares the value of that output signal with thresholds as criteria for respective ranges, determines a range, and then determines the selected range. The thresholds (limits) are set in advance as voltage values or current values, depending on the type of the output signal (see U.S. Pat. No. 4,914,594).

However, in the aforementioned contact-type sensor and in the non-contact-type sensor of the related art, when the output value of the sensor is determined, the position of the shift lever is univocally determined, so that the selected range is unequivocally determined. In other words, only a single combination of thresholds for determining a range is set for a given output value of the sensor and a determination of range is made according to a single shift range determination pattern. Therefore, even if different control operations are performed in an automatic transmission control unit, only one item of range information can be obtained. In other words, optimal range information cannot be obtained for each of the various control operations.

SUMMARY OF THE INVENTION

It is an object of the present invention to provide a range determination apparatus, a range determination method, and a program there for which make it possible to solve the problems of the range determination apparatus of the related art and to obtain optimal range limits for each control operation.

According to one aspect of the present invention, a range determination apparatus comprises a sensor that generates a continuous output signal in response to operation of a shift operation member for selecting a range in a power train, and range determination processing means that compares the value of the output signal with a range determination pattern arbitrarily set for a control operation and that determines a range for that control operation.

The apparatus preferably has plural range determination patterns corresponding to respective different control operations wherein the range determination processing means compares the output value with plural range determination patterns to determine a range independently for each of the different control operations.

The plural range determination patterns include at least two different range determination patterns and may also include a range determination pattern shared in common by at least two different control operations.

Because the value of the signal output by the sensor is compared with the range determination pattern arbitrarily set for each of the control operations, and a range where each of the control operations is to be performed is independently determined, optimal range information can be obtained for each of the control operations and each of the control operations can be appropriately performed.

The range determination apparatus may further comprise control processing means for executing each of the control operations for respective plural components to be controlled. Therefore, each of the control operations can be performed in a manner appropriate for each of the components, individually.

As noted above, the range determination patterns may be set individually for each of the control operations. In this case, since a range determination pattern is set individually for each of the control operations, a range can be determined individually and precisely for each of the control operations. Accordingly, optimal range information can be obtained for each of the control operations and each of the control operations can be appropriately performed using that optimal range information.

Where a range determination pattern is shared in common by two or more of the components to be controlled, common range information can be obtained for the control operations performed for at least two of the components to be controlled, the use of which makes it possible to reduce the number of logics for determining a range and to perform each of the control operations appropriately. For example, a common range determination pattern may be set for the transmission control operations whereby the number of logics required for determining a range for the transmission (wherein many different operations are performed) can be drastically reduced.

The sensor may generate a linear output value on the basis of the driver's operation of the shift operation member so that a range can be determined more easily and more accurately. The sensor may be a non-contact type sensor, whereby the sensor is less likely to wear out or to deteriorate through aging, and can generate stable outputs over a long period of time.

Limits may be set for a plurality of operating ranges in a given range determination pattern, and an intermediate position range may be set between adjacent operating ranges. In an intermediate position range, advance control processing means may perform advance control for a range to be subsequently set. In this case, when movement of shift operation member from one shift position to another is initiated, a control operation for the range to be subsequently set can be performed as advance control. Therefore, the occurrence of gearshift shock can be effectively suppressed by reducing the frequency of control delay, for example, during garage control.

The control operations for the other components to be controlled can be optimally performed as well by reducing the frequency of control delay.

As used herein, the terminology "garage control" means hydraulic pressure control responsive to movement of the shift lever by the driver from a position for a non-driving range (P or N) to a position for a driving range (D or R).

DETAILED DESCRIPTION OF PREFERRED EMBODIMENTS

Hereinafter, embodiments of the present invention will be described in detail with reference to the drawings. Although a vehicle with a staged automatic transmission is described by way of example, the present invention is also applicable to a continuously variable transmission, a semiautomatic transmission, an electric drive unit having a drive motor as a drive source, an electric drive unit having a drive motor, a drive train having an engine and a generator as drive sources, and the like.

A first preferred embodiment of the present invention will now be described with references to FIGS. 1–3.

Figure 1:
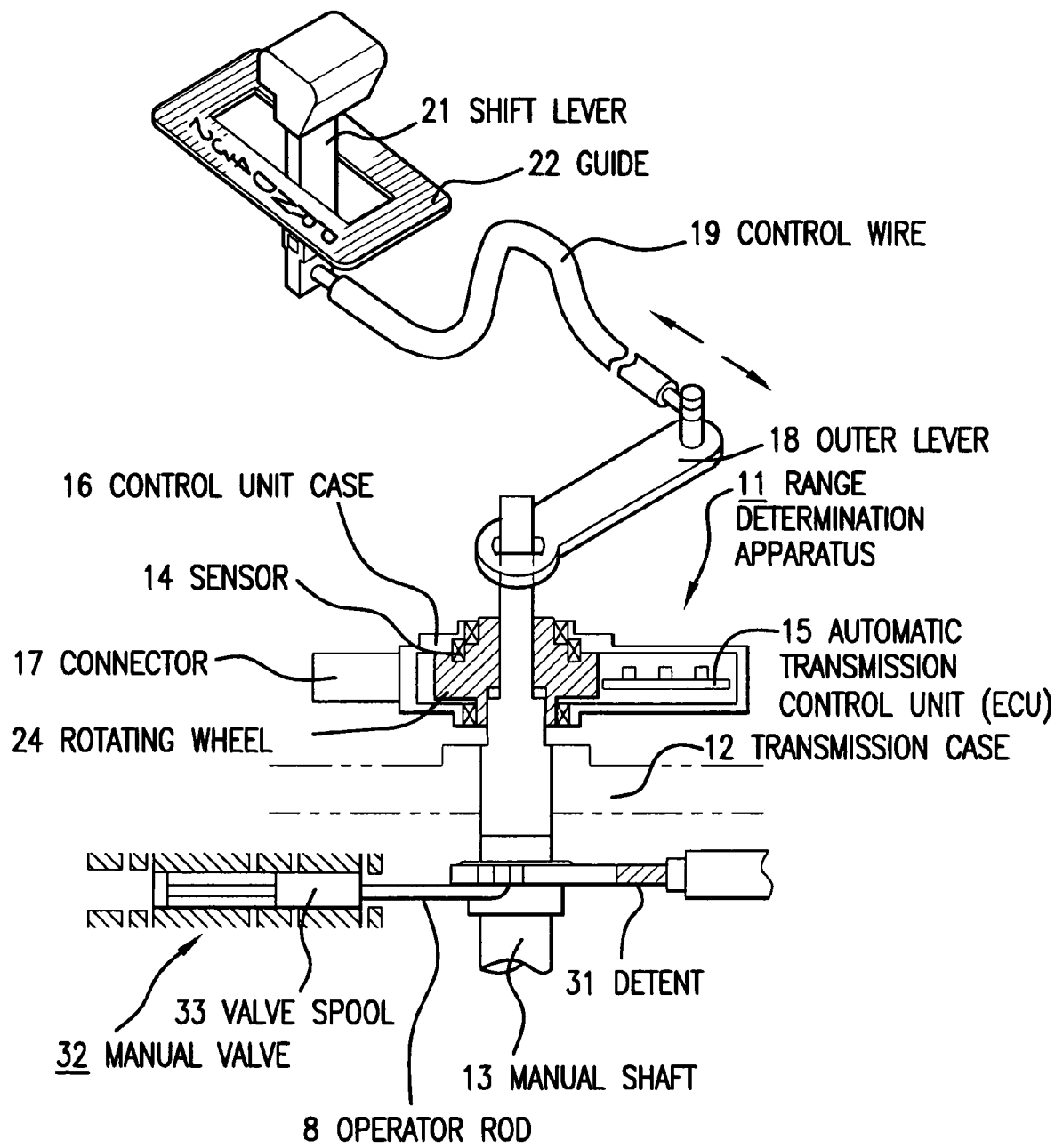
FIG. 1 is a schematic view showing a first embodiment of a range determination apparatus in accordance with the present invention.

FIG. 1 shows the first preferred embodiment as including a range determination apparatus 11, an automatic transmission case 12, and a manual shaft 13. The range determination apparatus 11 includes a control unit case 16, here a box-like body disposed outside the automatic transmission case 12, a sensor 14 attached to the manual shaft 13 in the control unit case 16, an automatic transmission control unit 15, a connector 17 mounted outside the control unit case 16 and the like. The automatic transmission control unit 15 disposed inside the control unit case 16 functions as a computer and controls the automatic transmission. The connector 17 has a plurality of terminals connected to a plurality of various components. Such components include, for example, solenoids in the automatic transmission, such as linear solenoids, on-off solenoids, and the like, the engine, indicators, vehicular control elements, and the like. The sensor 14 and the automatic transmission control unit 15 are electrically connected to each other and constitute a control unit integrated with a sensor.

In this description of the first embodiment, the term "engine" refers to at least one of the engine proper, a starter motor for starting the engine, a starter circuit and a starter relay circuit as starting circuits for the engine, an engine controller, and the like.

The manual shaft 13 extends through the automatic transmission case 12, and connects outside the case 12 to an outer lever 18 and is coupled, via the outer lever 18 and a control wire 19, to a shift lever 21 which serves as a gearshift operation member. Inside the automatic transmission case 12, the manual shaft 13 is coupled to a detent 31 and a valve spool 33 of a manual valve 32. The detent is a plate presenting an edge with plural detents or notches corresponding to the various ranges for selectively receiving an operating member 8 of the manual value 32. The shift lever 21 is manually movable for selection of a range for the automatic transmission. Hence, the manual shaft 13 and detent 31 are turned as the shift lever 21 is moved along a guide 22 between positions for the different ranges such as a parking range (P range), a reverse range (R range), a neutral range (N range), a drive range (D range), a fourth-speed range, a third-speed range, and a second-speed range. The fourth-speed, third-speed, and second-speed ranges can be established by an automatic gearshift operation, or by a manual gearshift operation.

The sensor 14 is coupled to the manual shaft 13, and has a rotating wheel 24 that turns integrally with the manual shaft 13. The sensor 14 detects the turning angle of the rotating wheel 24 indicating the movement of the shift lever 21, namely, turning angle e expressed in units of "degrees." The sensor 14 is itself conventional and is a non-contact type which generates and outputs one continuous analog signal that changes in accordance with extent of movement of the shift lever 21, namely, a range detection signal output (sensor output) as a voltage value ("voltage") in the first embodiment.

Figure 2:
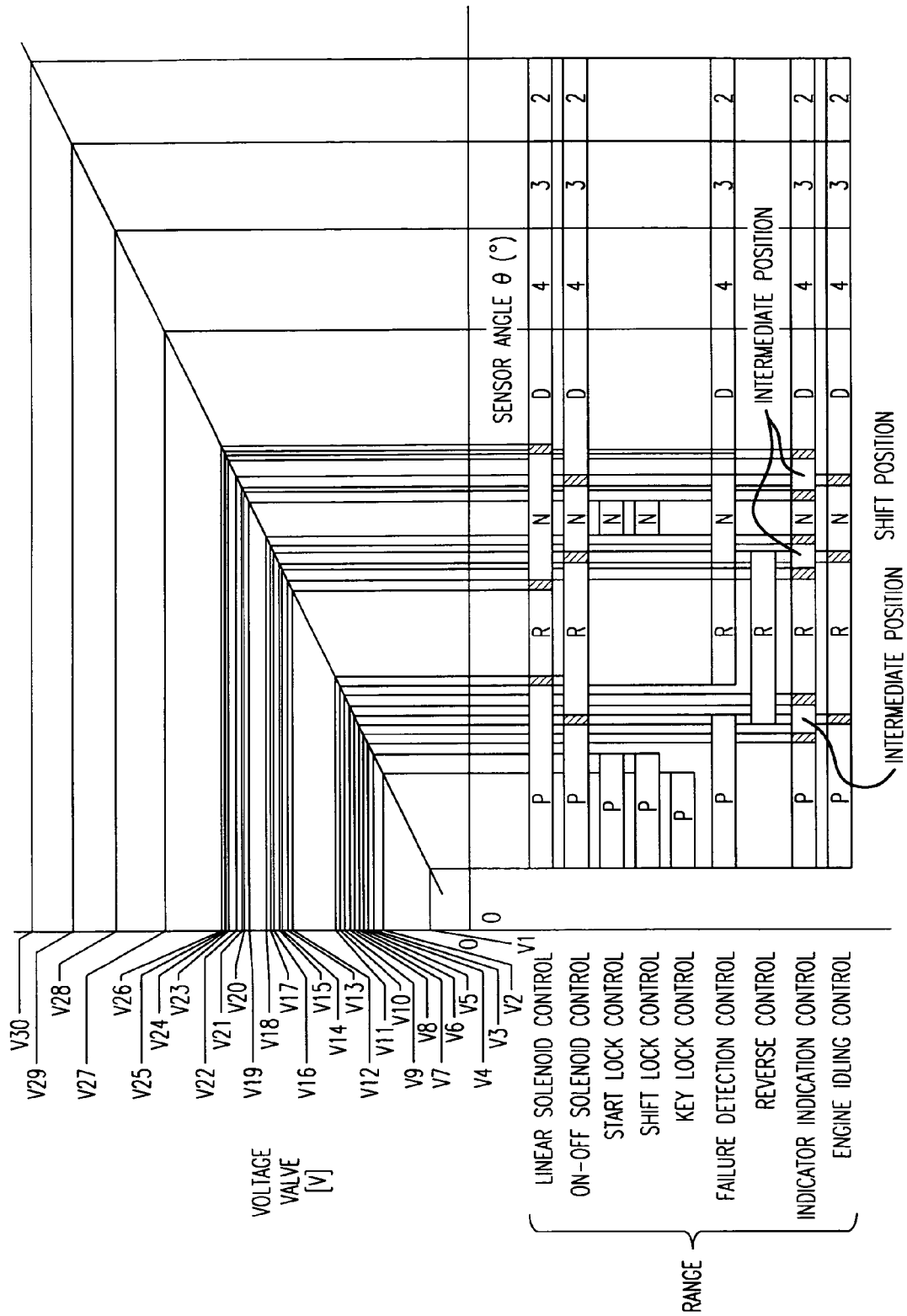
FIG. 2 shows ranges for control operations correlated with voltage values of the signal of a sensor in the first embodiment of the present invention.

As shown in FIG. 2, the sensor 14 has linear input/output characteristics. Responsive to a driver's operation of the shift lever 21, the sensor 14 generates a voltage signal of a value that changes linearly and continuously in accordance with change (an increase or a decrease) in angle e on the input side. In the first embodiment, the sensor 14 generates a voltage value as an output signal. However, the sensor 14 may also be designed to generate another electrical parameter as an output signal, for example, a current value.

Movement of spool valve 33 of manual valve 32 changes the state of a hydraulic circuit so that the hydraulic circuit is brought into communication with a line-pressure oil passage, a D-range-pressure oil passage, an R-range-pressure oil passage, or the like.

In an automatic transmission equipped with the range determination apparatus 11 of the first embodiment, ranges such as the parking range, the reverse range, the neutral range, the drive range, the fourth-speed range, the third-speed range, and the second-speed range are set as described above, by operation of the shift lever 21. A voltage value and the angle e of the sensor 14 are so set as to correspond to each of the ranges. Each voltage value serves to determine a range set by the shift lever 21, and the limits (thresholds) serving as criterial values (criteria) are voltage values for determining a range independently for each of the control operations.

As the shift lever 21 is moved along the guide 22, the manual shaft 13 is turned via the control wire 19 and the outer lever 18 and the detent 31 are turned integrally with the turning of the manual shaft 13. The valve spool 33 coupled to the detent 31 through operator rod 8 is moved in accordance with turning displacement of the manual shaft. 13, and generates range pressures such as a second-range pressure, a third-range pressure, a fourth-range pressure, a D-range pressure, an R-range pressure, and the like.

As the shift lever 21 is selectively moved to one of range positions P, R, N, D, 4, 3 and 2 indicated on the guide 22 and representing the respective ranges, the valve spool 33 moves to a valve position preset in association with said one of the range positions to set the manual valve 32 at a corresponding hydraulic pressure generation position and the automatic transmission is shifted to a range corresponding to the hydraulic pressure generation position. With the automatic transmission set to a range, the detent 31 prevents the manual shaft 13 from turning, and the shift lever 21 is held at the selected range.

Responsive to the turning of the manual shaft 13, the sensor 14 turns and generates a signal of a voltage value corresponding to a position angle θ, and outputs the voltage value to the automatic transmission control unit 15. Upon receiving the voltage value from the sensor 14, the automatic transmission control unit 15 compares the voltage value with threshold (limit) values or one of the preset patterns, determines a range for a control operation in accordance with the position of the voltage value within a range determination patter, and outputs a control signal from a corresponding one of the terminals of the connector 17 to a component to be controlled outside the control unit case 16 in accordance with the determined range.

Thus, various control operations such as automatic transmission control, engine control (in cooperation with the engine controller), indicator control and the like are performed based on commands from the automatic transmission control unit (ECU) 15. Operations thus controlled include, for example, linear solenoid control of the automatic transmission, on-off solenoid control of the automatic transmission, start lock control of the engine (engine drive control), shift lock control of the automatic transmission, lock control of the ignition key, failure detection control of the automatic transmission, reverse lamp control, reverse control of the automatic transmission (reverse inhibition control), indicator operation (lighting of indicator displays), idling control of the engine, fuel injection control of the engine, and the like. For this purpose, a control processor 43 ("control processing means") is incorporated into the automatic transmission control unit 15. The control processor 43 executes control routines, which may be stored in memory 44 ("machine readable medium") for performance of the aforementioned control operations.

In linear solenoid control of the automatic transmission, the automatic transmission control unit 15 controls a linear solenoid valve on the basis of a gearshift control operation preset for the determined range, regulates hydraulic pressure output from the manual valve 32, and delivers that hydraulic pressure to hydraulic servos for frictional engagement elements such as clutches, brakes and the like of the automatic transmission.

In on-off solenoid control of the automatic transmission, the automatic transmission control unit 15 controls an on-off solenoid valve on the basis of a gearshift control operation preset for the determined range, and delivers the hydraulic pressure output from the manual valve 32 to the linear solenoid valve or delivers a hydraulic pressure regulated by the linear solenoid valve to the hydraulic servos.

In start lock control of the engine, the automatic transmission control unit 15 allows the engine to be started in certain ranges, for example the parking range and the neutral range, and prohibits the engine from being started in the other ranges.

In shift lock control of the automatic transmission, the automatic transmission control unit 15 locks the shift lever 21 by means of a solenoid so as to prohibit a shift operation of the automatic transmission in certain ranges, for example the parking range and the neutral range, and unlocks the shift lever 21 so as to permit a shift operation of the automatic transmission in the other ranges.

In key lock control of the vehicle, the automatic transmission control unit 15 allows the key to be removed in a certain range, for example the parking range, and prohibits the key from being removed in the other ranges.

In failure detection control of the automatic transmission, the automatic transmission control unit 15 detects a failure in the automatic transmission. In driving ranges, i.e., drive and reverse ranges, the automatic transmission control unit 15 checks whether or not a required hydraulic pressure has been generated and checks whether or not a desired gear ratio can be obtained. In non-driving ranges, i.e., the parking and neutral ranges, the automatic transmission control unit 15 checks whether or not generation of a hydraulic pressure has been prevented.

In reverse control of the automatic transmission, the automatic transmission control unit 15 lights the reverse lamp if the automatic transmission is set in the reverse range, and allows reverse running if the automatic transmission is set in the reverse range with a predetermined condition fulfilled, e.g., a vehicle speed below a predetermined speed.

In indicator control, the automatic transmission control unit 15 indicates a set range on the instrument panel of the vehicle.

In engine idle control, the automatic transmission control unit 15 reduces the engine speed during idling of the engine.

In the first embodiment, the automatic transmission control unit 15 performs engine control, indicator control, and the like. However, the automatic transmission control unit 15 may also transmit control signals to the engine control unit, an indicator control unit and the like so as to assist the engine control unit in performing engine control and to assist the indicator control unit in performing indicator control.

Figure 3:
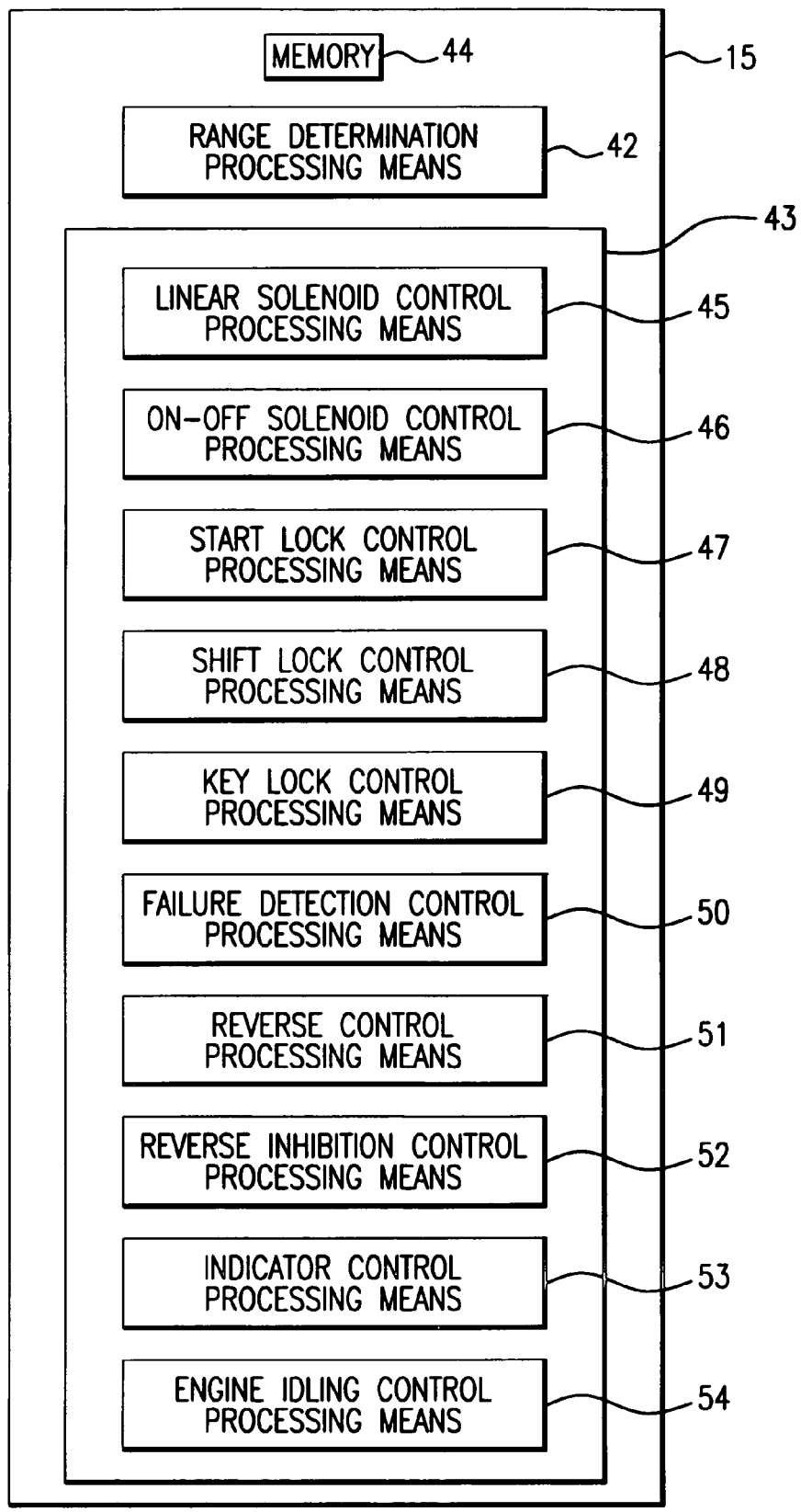
FIG. 3 is a block diagram of a programmed ECU used in the first embodiment of the present invention.

In the range determination apparatus 11 of the first embodiment, as shown in FIG. 3, the automatic transmission control unit 15 includes a range determination processing means 42, and a range determination logic for determining a range is stored in memory 44. The range determination logic is designed for execution of a range determination routine and for determination of ranges for the control operations such as automatic transmission control, engine control, indicator control and the like, on the basis of the aforementioned limits. More specifically, the range determination logic is designed, for example, to determine a range for linear solenoid control, to determine a range for on-off solenoid control, to determine a range for start lock control, to determine a range for shift lock control, to determine a range for key lock control, to determine a range for failure detection control, to determine a range for reverse control, to determine a range for indicator control, and to determine a range for engine idle control. In this case, since only one range signal is generated by the rotating wheel 24, the sensor 14 can be simplified in structure.

In the range determination apparatus 11 of the first embodiment, the limits (thresholds) used in determining a range are set arbitrarily or individually and independently for each of the control operations such as engine control, indicator control and the like. That is, a range determination pattern composed of limits or "thresholds" for each of the ranges is set for each of the control operations. Thus, the voltage value is compared with the range determination pattern for each of the control operations, and a range can be determined by comparing the voltage value with a range defined by the limits.

The limits for each of the control operations will now be described more specifically with reference to FIG. 2.

Referring to FIG. 2, limits Vi (i=1, 2, . . . , 30) increase as the value "i" increases, and decrease as the value "i" decreases. The limits Vi for each of the control operations are shown in FIG. 2 only as examples and can be arbitrarily set. In the first embodiment, for convenience of explanation, a range between two limits Vi such as limits Vm and Vm+1, namely, a voltage value range is defined by the limits ("thresholds") Vm–Vm+1, i.e., equal to or larger than Vm and smaller than or equal to Vm+1.

In the range determination apparatus 11 of the first embodiment, the parking range, the reverse range, the neutral range, the drive range, the fourth-speed range, the third-speed range, and the second-speed range are first set as ranges for linear solenoid control, as in the case of the gearshift ranges in the automatic transmission of the related art. The ranges for linear solenoid control are determined as follows.

A voltage value range within the limits V1–V11 is set the parking range in linear solenoid control. The range determination processing means 42 of the automatic transmission control unit 15 executes the range determination. If a voltage value output from the sensor 14 during linear solenoid control is within the voltage value range of the limits V1–V11, the range determination processing means 42 determines the parking range for linear solenoid control, and the linear solenoid control processing means 45 executes a program for linear solenoid control.

A voltage value range V10–V13 is set as the reverse range for linear solenoid control. If a voltage value output from the sensor 14 during linear solenoid control is within the voltage value range defined by the limits V10–V13, the range determination processing means 42 determines the reverse range for linear solenoid control, and sets the automatic transmission in the reverse range for linear solenoid control. An overlapping range is set in a border region between the parking range and the reverse range.

A voltage value range defined by the limits V12–V26 is set as the neutral range. Thus, the limits ("thresholds") V12 and V26 serve to determine that the neutral range for linear solenoid control and, if a voltage value of a signal output from the sensor 14 during linear solenoid control is within the voltage value range of V12–V26, the range determination processing means 42 determines the neutral range for linear solenoid control, and sets the automatic transmission in the neutral range for linear solenoid control. An overlapping range is set in a border region between the reverse range and the neutral range.

A voltage value range defined by the limits V24–V27 is set as the drive range in linear solenoid control. If the voltage value of a signal output from the sensor 14 during linear solenoid control is within the voltage value range of V24–V27, the range determination processing means 42 determines the drive range for linear solenoid control, and sets the automatic transmission in the drive range for linear solenoid control.

A voltage value range defined by the limits V27–V28 is set as the fourth-speed range for linear solenoid control. If the voltage value output from the sensor 14 during linear solenoid control is within the voltage value range of V27–V28, the range determination processing means 42 determines the fourth-speed for linear solenoid control, and sets the automatic transmission in the fourth-speed range for linear solenoid control.

A voltage value range defined by the limits V28–V29 is set as the third-speed range in linear solenoid control. If a voltage value output from the sensor 14 during linear solenoid control is within the voltage value range of V28–V29, the range determination processing means determines the third-speed range for linear solenoid control, and sets the automatic transmission in the third-speed range for linear solenoid control.

A voltage value range of V29–V30 is set as the second-speed range for linear solenoid control. If a voltage value output from the sensor 14 during linear solenoid control is within the voltage value range of V29–V30, the range determination processing means determines the second-speed range for linear solenoid control, and sets the automatic transmission in the second-speed range for linear solenoid control.

Although an arbitrary point is set as a limit within an area where two adjacent ranges either partially or entirely overlap, a voltage range where no determination of range is made may also be provided between two adjacent ranges. The later case is illustrated by the gap between parking and reverse in failure detection control shown in FIG. 2. In this manner, a range can be determined more accurately.

The range determination apparatus 11 of the first embodiment sets the parking range, the reverse range, the neutral range, the drive range, the fourth-speed range, the third-speed range and the second-speed range for on-off solenoid control, as in the case of the aforementioned ranges for linear solenoid control. The ranges for on-off solenoid control are determined as follows.

That is, a voltage value range with the limits V1–V7 is set as the parking range in on-off solenoid control. The limits V1 and V7 serve to determine the parking range for on-off solenoid control when the range determination processing means executes a range determination routine. If the voltage value of the signal output from the sensor 14 during on-off solenoid control is within the voltage value range of V1–V7, the range determination processing means determines the parking range for on-off solenoid control, and sets the automatic transmission in the parking range for on-off solenoid control, and the on-off solenoid processing means 46 executes a program for on-off solenoid control.

A voltage value range of V6–V16 is set for the reverse range for solenoid control. If the voltage value of the signal output from the sensor 14 during on-off solenoid control is within the range of V6–V16, the range determination processing means determines the reverse range for on-off solenoid control, and sets the automatic transmission in the reverse range for on-off solenoid control. An overlapping range is set in a border region between the parking range and the reverse range.

A voltage value range of V15–V22 is set as the neutral range in on-off solenoid control. If the voltage value of the signal output from the sensor 14 during on-off solenoid control is within the range of V15–V22, the range determination processing means determines the neutral range has been selected in on-off solenoid control, and sets the automatic transmission in the neutral range for on-off solenoid control. An overlapping range is set in a border region between the reverse range and the neutral range.

A voltage value range of V21–V27 is set as the drive range in on-off solenoid control. If the voltage value of the signal output from the sensor 14 during on-off solenoid control is within the voltage value range of V21–V27, the range determination processing means determines that the drive range has been selected during on-off solenoid control, and sets the automatic transmission in the drive range for on-off solenoid control.

A voltage value range of V27–V28 is set as the fourth-speed range in on-off solenoid control. If the voltage value of the signal output from the sensor 14 during on-off solenoid control is within the voltage value range of V27–V28, the range determination processing means determines the fourth-speed range for on-off solenoid control, and sets the automatic transmission in the fourth-speed range for on-off solenoid control.

A voltage value range of V28–V29 is set as the third-speed range in on-off solenoid control. If a voltage value output from the sensor 14 during on-off solenoid control is within the voltage value range of V28–V29, the range determination processing means determines the third-speed range in on-off solenoid control, and sets the automatic transmission in the third-speed range for on-off solenoid control.

A voltage value range of V29–V30 is set as indicating the second-speed range in on-off solenoid control. If the voltage value of the signal output from the sensor 14 during on-off solenoid control is within the range of the limits V29–V30, the range determination processing means determines the second-speed range in on-off solenoid control, and sets the automatic transmission in the second-speed range for on-off solenoid control.

In the range determination apparatus 11 of the first embodiment, start lock control allows the engine to be started only in parking and neutral ranges (non-driving ranges). The ranges for start lock control are set as follows.

A voltage value range of V1–V3 is set as the parking range in start lock control. In execution of the range determination routine, if the voltage value of the signal output from the sensor 14 during start lock control is within the voltage value range of V1–V3, the range determination processing means determines the parking range in start lock control, and sets the automatic transmission in the parking range for start lock control. A start lock control processing means 47 of the automatic transmission control unit 15 executes a start lock control routine, and outputs a signal to the engine control unit or to the relay circuit of the starter motor to enable operation of the starter motor for starting the engine. The limit V3 is set smaller than the limit V11 that serves as a threshold for determining a range for garage control.

If the voltage value of the signal output from the sensor 14 is not within the voltage value range V1–V3, the range determination processing means 42 determines the parking range in start lock control, and the start lock control processing means 47 abstains from outputting a signal to the engine control unit or the relay circuit of the starter motor that would render operable the starter motor for starting the engine.

A voltage value range of V18–V19 is set the neutral range for start lock control. In execution of the range determination routine, if the voltage value of the output from the sensor 14 during start lock control is within the range of V18–V19, the range determination processing means 42 determines the neutral range in start lock control, and sets the automatic transmission in the neutral range for start lock control. The start lock control processing means 47 outputs a signal, rendering the starter motor operable for starting the engine, to the engine control unit or to the relay circuit of the starter motor. The limits V18 and V19 are set larger than the limit V12 and smaller than the limit V26, respectively. The limit V12 serves as a threshold for determining a range for linear solenoid control. The limits V18 and V19 are set larger than the limit V15 and smaller than the limit V22, respectively. The limit V15 serves as a threshold for determining a range for on-off solenoid control.

If the voltage value of the signal output from the sensor 14 is not within the range of V18–V19, the range determination processing means does not determine the neutral range in start lock control, and the start lock control processing means abstains from outputting a signal to the engine control unit or to the relay circuit of the starter motor for rendering the starter motor operable for starting the engine.

Instead of defining the parking range for start lock control or the neutral range for start lock control, the limits V1, V3, V18 and V19 may define a range where a signal to the start motor for starting the engine is output in a non-driven state, or to define a range where the parking range and the neutral range are not distinguished from each other. In other control operations as well, if the same control (e.g., shift lock P and N) is performed for both the parking and neutral ranges, they need not be distinguished from each other.

In the range determination apparatus 11 of the first embodiment, the limit V1 for the parking range for start lock control is the same as the limit V1 for the parking range in both linear solenoid control and on-off solenoid control. However, they may be set different from each other.

In the range determination apparatus 11 of the first embodiment, only the parking range and the neutral range (non-driving ranges) are set for shift lock control, as in the case of start lock control. The voltage values used as limits for determining a range for shift lock control are set equal to the limits V1, V3, V18 and V19 used for determining a range for start lock control, respectively. The aforementioned ranges for shift lock control are set as follows.

A voltage e range of V1–V3 is set as the parking range in shift lock control. In execution of the range determination routine, if the voltage value of the signal output from the sensor 14 during shift lock control is within the range of V1–V3, the range determination processing means determines the parking range in shift lock control, and sets the automatic transmission in the parking range for shift lock control. A shift lock control processing mans 46 of the automatic transmission control unit 15 executes a shift lock control routine, and turns a shift lock solenoid off to prohibit the shift lever 21 from being moved and thereby preventing a gearshift operation.

If the voltage value of the signal output from the sensor 14 is not within the voltage value range of V1–V3, the range determination processing means 42 does not determine the parking range in shift lock control, and the shift lock control processing means 48 turns the shift lock solenoid on to allow the shift lever 21 to be moved, thereby allowing gearshift operation.

A voltage value range, of V18–V19 is set as the neutral range in shift lock control. In executing the range determination routine, if the voltage value of the signal output from the sensor 14 during shift lock control is within the voltage value range of V18–V19, the range determination processing means 42 determines the neutral range in shift lock control, and sets the automatic transmission in the neutral range for shift lock control. The shift lock control processing means 48 turns the shift lock solenoid off to prohibit the shift lever 21 from being moved.

If the voltage value of the signal output from the sensor 14 is not within the voltage value range of V18–V19, the range determination processing means 42 does not determine the neutral range in shift lock control, and the shift lock control processing means 48 turns the shift lock solenoid on to allow the shift lever 21 to be moved.

The limits V1 and V3 for the parking range in shift lock control may also be set different from the limits V1 and V3 for the parking range in start lock control, respectively. The limits V18 and V19 for the neutral range in shift lock control may also be set different from the limits V18 and V19 for the neutral range in start lock control, respectively.

In the range determination apparatus 11 of the first embodiment, key lock is in effect when the vehicle is not in use. Therefore, only the parking range may be set for key lock control. The parking range in key lock control is set as follows.

A voltage value range of V1–V2 is set as the parking range in key lock control. In executing the range determination routine, if the voltage value of the signal output from the sensor 14 during key lock control is within the range of V1–V2, the range determination processing means 42 determines the parking range in key lock control, and sets the automatic transmission in the parking range for key lock control. A key lock control processing means 49 of the automatic transmission control unit 15 executes a key lock control routine, and outputs a key lock control signal to a key lock control unit. Responsive to receipt of that signal the key lock control unit releases key lock and allows the key to be removed.

The limit V2 is set smaller than the limit V3 that serves to determine a range for start lock control.

If the voltage value of the signal output from the sensor 14 is not within the voltage value range of V1–V2 the range determination processing means 42 does not determine the parking range in key lock control, the key lock control processing means 49 abstains from outputting a key lock control signal to the key lock control unit, and the key lock control unit sets key lock to prevent the key from being removed. In the first embodiment, the key lock control processing means 49 outputs a key lock control signal to the key lock control unit; however, alternatively, the key lock control processing means 49 may output a key lock control signal to a key lock solenoid.

In the range determination apparatus 11 of the first embodiment, the parking range, the reverse range, the neutral range, the drive range, the fourth-speed range, the third-speed range, and the second-speed range are also set for failure detection control for detecting a failure in the automatic transmission. The ranges for failure detection control are set as follows.

A voltage value range of V1–V7 is set as the parking range in failure detection control. In execution of the range determination routine, if a voltage value of the signal output from the sensor 14 during failure detection control is within the range of V1–V7, the range determination processing means 42 determines the parking range in failure detection control, and sets the automatic transmission in the parking range for failure detection control. A failure detection control processing means 50 of the automatic transmission control unit 15 executes a failure detection control routine for a state wherein the automatic transmission is set in the parking range.

If the voltage value of the signal output from the sensor 14 is not within the range of V1–V7, the range determination processing means 42 does not determine parking range for failure detection control, and the failure detection control processing means 50 sets the automatic transmission accordingly.

A voltage value range of V10–V13 is set as the reverse range in failure detection control. If the voltage value of the signal output from the sensor 14 during failure detection control is within the range of V10–V13, the range determination processing means 42 determines the reverse range in failure detection control, and sets the automatic transmission in the reverse range for failure detection control.

If the voltage value of the signal output from the sensor 14 is not within the range of V10–V13, the range determination processing means 42 does not determine the reverse range in failure detection control, and the failure detection control processing means 50 sets the automatic transmission in a state of not detecting a failure.

A voltage value range of V15–V22 is set as the neutral range in failure detection control. If the voltage value of the signal output from the sensor 14 during failure detection control is within the range of V15–V22, the range determination processing means 42 determines the neutral range in failure detection control, and sets the automatic transmission in the neutral range for failure detection control and the failure detection control processing means 50 sets the automatic transmission in a state of not detecting a failure.

If the voltage value of the signal output from the sensor 14 is not within the range of V15–V22, the range determination processing means does not determine the neutral range in failure detection control, and the failure detection control processing means 50 sets the automatic transmission in a state of not detecting a failure.

A voltage value range of V24–V27 is set as the drive range in failure detection control. If the voltage value of the signal output from the sensor 14 during failure detection control is within the range of V24–V27, the range determination processing means 42 determines the drive range in failure detection control, and sets the automatic transmission in the drive range for failure detection control and the failure detection control processing means 50 sets the automatic transmission in a state of detecting a failure.

If the voltage value of the signal output from the sensor 14 is not within the range of V24–V27, the range determination processing means does not determine the drive range in failure detection control, and the failure detection control processing means 50 sets the automatic transmission in a state of not detecting a failure.

A voltage value range of V27–V28 is set as the fourth-speed range in failure detection control. If the voltage value of the signal output from the sensor 14 during failure detection control is within the range of V27–V28, the range determination processing means 42 determines the fourth-speed range in failure detection control, sets the automatic transmission in the fourth-speed range for failure detection control, and the failure detection control processing means 50 sets the automatic transmission in a state of not detecting a failure.

If the voltage value of the signal output from the sensor 14 is not within the voltage value range of V27–V28, the range determination processing means 42 does not determine that the fourth-speed in failure detection control, and the failure detection control processing means 50 sets the automatic transmission in a state of not detecting a failure.

A voltage value range of V28–V29 is set as the third-speed range in failure detection control. If the voltage value of the signal output from the sensor 14 during failure detection control is within the range of V28–V29, the range determination processing means 42 determines the third-speed range in failure detection control, sets the automatic transmission in the third-speed range for failure detection control, and the failure detection control processing means 50 sets the automatic transmission in a state of detecting a failure.

If the voltage value of the signal output from the sensor 14 is not within the range of V28–V29, the range determination processing means 42 does not determine the third-speed range in failure detection control, and the failure detection control processing means 50 sets the automatic transmission in a state of not detecting a failure.

The voltage value range of V29–V30 is set as the second-speed range in failure detection control. If the voltage value of the signal output from the sensor 14 during failure detection control is within the range of V29–V30, the range determination processing means 42 determines the second-speed range in failure detection control, sets the automatic transmission in the second-speed range for failure detection control, and the failure detection control processing means 50 sets the automatic transmission in a state of detecting a failure.

If the voltage value of the signal output from the sensor 14 is not within the range of V29–V30, the range determination processing means 42 does not determine the second-speed range in failure detection control, and the failure detection control processing means 50 sets the automatic transmission in a state of not detecting a failure.

In the range determination apparatus 11 of the first embodiment, only the reverse range is set for reverse control. The reverse range for reverse control is set as follows A voltage value range of V6–V16 is set as the reverse range in reverse control. If the voltage value of the signal output from the sensor 14 during reverse control is within the range of V6–V16, the range determination processing means determines the reverse range in reverse control, sets the automatic transmission in the reverse range for reverse control, and a reverse control processing means 51 of the automatic transmission control unit 15 executes a reverse control routine, and sets the transmission in reverse. In addition, a reverse inhibition control processing means 52, of the automatic transmission control unit 15, executes a reverse inhibition control routine, and sets the automatic transmission to inhibit a shift into reverse.

If the voltage value of the signal output from the sensor 14 is not within the range of V6–V16 in reverse control, the range determination processing means 42 does not determine that the reverse range has been selected, and the reverse control processing means 51 does not turn on the reverse lamp. In addition, the reverse inhibition control processing means 52 does not perform reverse inhibition at this time.

In operation of the range determination apparatus 11 of the first embodiment, the parking range, the reverse range, the neutral range, the drive range, the fourth-speed range, the third-speed range, and the second-speed range are also set for indicator control of the automatic transmission. The ranges for indicator control are set as follows.

A voltage value range of V1–V5 is set as the parking range in indicator control. In execution of the range determination routine, if the voltage value of the signal output from the sensor 14 during indicator control is within the range of V1–V5, the range determination processing means 42 determines the parking range in indicator control, and sets the automatic transmission in the parking range for indicator control, and an indicator control processing means 53 executes an indicator control routine.

If the voltage value of the signal output from the sensor 14 is not within the range of V1–V5, the range determination processing means 42-does not determine the parking range in indicator control.

The voltage value range of V4–V9 is set as a first intermediate position where no determination of a range is made. The limits V4 and V9 serve to define the first intermediate position in indicator control. An overlapping range is set as a border region between the parking range and the first intermediate position range.

A voltage value range of V8–V14 is set as the reverse range in indicator control. In execution of the range determination routine, if the voltage value of the signal output from the sensor 14 during indicator control is within the range of V8–V14, the range determination processing means 42 determines the reverse range in indicator control, and sets the automatic transmission in the reverse range for indicator control, and indicator control processing means 53 executes an indicator control routine.

If the voltage value of the signal output from the sensor 14 is not within the range of V8–V14, the range determination processing means does not determine the reverse range in indicator control. An overlapping range is set for a border region between the first intermediate position and the reverse range.

A voltage value range of V13–V18 is set as a second intermediate position where no determination of a range is made in indicator control. An overlapping range is set in a border region between the reverse range and the second intermediate position.

A voltage value range of V17–V20 is set as the neutral range in indicator control. In execution of the range determination routine, if the voltage value of the signal output from the sensor 14 during indicator control is within the range of V17–V20, the range determination processing means 42 determines the neutral range in indicator control, sets the automatic transmission in the neutral range for indicator control, and indicator control processing means 53 executes an indicator control routine.

If the voltage value of the signal output from the sensor 14 is not within the range of V17–V20, the range determination processing means 42 does not determine the neutral range in indicator control and an overlapping range is set in a border region between the second intermediate position and the neutral range.

A voltage value range of V19–V24 is set as a third intermediate position where no determination of a range is made in indicator control. An overlapping range is set in a border region between the neutral range and the third intermediate position range.

A voltage value range of V23–V27 is set as the drive range in indicator control. In execution of the range determination routine, if the voltage value of the signal output from the sensor 14 during indicator control is within the range of V23, V27, the range determination processing means 42 determines the drive range in indicator control, sets the automatic transmission in the drive range for indicator control, and the indicator control routine is executed by the indicator control processing means 53.

If the voltage value of the signal output from the sensor 14 is not within the range of V23–V27, the range determination processing means 42 does not determine the drive range in indicator control.

A voltage value range of V27–V28 is set as the fourth-speed range in indicator control. If the voltage value of the signal out put from the sensor 14 during indicator control is within the range of V27–V28, the range determination processing means 42 determines that the fourth-speed range has been selected in indicator control, sets the automatic transmission in the fourth-speed range for indicator control, and the indicator control processing means 53 executes the indicator control routine.

A voltage value of V28–V29 is set as the third-speed range in indicator control. If the voltage value of the signal output from the sensor 14 during indicator control is within the range of V28–V29, the range determination processing means 42 determines that the third-speed range has been selected in indicator control, and sets the automatic transmission in the third-speed range for indicator control and the indicator control processing means 53 executes the indicator control routine.

A voltage value range of V29–V30 is set as the range representing the second-speed range in indicator control. If the voltage value of the signal output from the sensor 14 during indicator control is within the range of V29–V30, the range determination processing means 42 determines the second-speed range in indicator control, and sets the automatic transmission in the second-speed range for indicator control and the indicator control processing means 53 executes the indicator control routine.

In the range determination apparatus 11 of the first embodiment, the parking range, the reverse range, the neutral range, the drive range, the fourth-speed range, the third-speed range, and the second-speed range are set in engine idling control, as in the aforementioned case of on-off solenoid control. The ranges for engine idling control are set as follows.

A voltage value range of V1–V7 is set for the parking range in engine idling control. In execution of the range determination routine, if the voltage value of the signal output from the sensor 14 during engine idling control is within the range of V1–V7, the range determination processing means 42 determines the parking range in engine idling control, and sets the automatic transmission in the parking range for engine idling control.

A voltage value range of V6–V16 is set as the reverse range in engine idling control. If the voltage value of the signal output from the sensor 14 during engine idling control is within the range of V6–V16, the range determination processing means 42 determines the reverse range in engine idling control, and sets the automatic transmission in the reverse range for engine idling control. An overlapping range is set for a border region between the parking range and the reverse range.

A voltage value range of V15–V22 is set as the neutral range in engine idling control. If the voltage value of the signal output from the sensor 14 during engine idling control is within the range of V15–V22, the range determination processing means 42 determines the neutral range in engine idling control, and sets the automatic transmission in the neutral range for engine idling control. An overlapping range is set for a border region between the reverse range and the neutral range.

A voltage value range of V21–V27 is set as the drive range in engine idling control. If the voltage value of the signal output from the sensor 14 during engine idling control is within the range of V21–V27, the range determination processing means 42. determines the drive range in engine idling control, and sets the automatic transmission in the drive range for engine idling control and the engine idling control processing means 54 executes an engine control routine in cooperation with the engine controller (not shown).

A voltage value range of V27–V28 is set as the fourth-speed range in engine idling control If the voltage value of the signal output from the sensor 14 during engine idling control is within the range of V27–V28, the range determination processing means 42 determines the fourth-speed range in engine idling control, and sets the automatic transmission in the fourth-speed range for engine idling control.

A voltage value range of V28–V29 is set as the third-speed range in engine idling control. If the voltage value of the signal output from the sensor 14 during engine idling control is within the range of V28–V29, the range determination processing means 42 determines the third-speed range in engine idling control, and sets the automatic transmission in the third-speed range for engine idling control.

A voltage value range of V29–V30 is set as the second-speed range in engine idling control. If the voltage value of the signal output from the sensor 14 during engine idling control is within the range of V29–V30, the range determination processing means 42 determines the second-speed range has been selected in engine idling control, and sets the automatic transmission in the second-speed range for engine idling control.

Although the limits V1, V6, V7, V15, V16, V21, V22, V27, V28, V29, and V30 for engine idling control are equal to the limits V1, V6, V7, V15, V16, V21, V22, V27, V28, V29, and V30 for on-off solenoid control, respectively, they maybe set different from each other.

Thus, in the range determination apparatus 11 of the first embodiment, the voltage values determining for the parking range are set arbitrarily and independently for each of the control operations such as linear solenoid control, on-off solenoid control, start lock control, shift lock control, key lock control, failure detection control, indicator control, engine idling control, and the like.

Likewise, the voltage values for determining the reverse range are set arbitrarily and independently for each of the control operations such as linear solenoid control, on-off solenoid control, failure detection control, reverse control, indicator control, engine idling control, and the like.

In addition, the voltage values for determining the neutral range are set arbitrarily and independently for each of the control operations such as linear solenoid control, on-off solenoid control, start lock control, shift lock control, failure detection control, indicator control, engine idling control s and the like.

Likewise, the voltage values for determining the drive range are also set arbitrarily and independently for each of the control operations such as linear solenoid control, on-off solenoid control, failure detection control, indicator control, engine idling control, and the like.

Thus, the range determination pattern is formed arbitrarily and. Independently for each of the control operations.

In the first embodiment, the limits for in each of the aforementioned ranges are set in accordance with a specific purpose.

Figure 4:
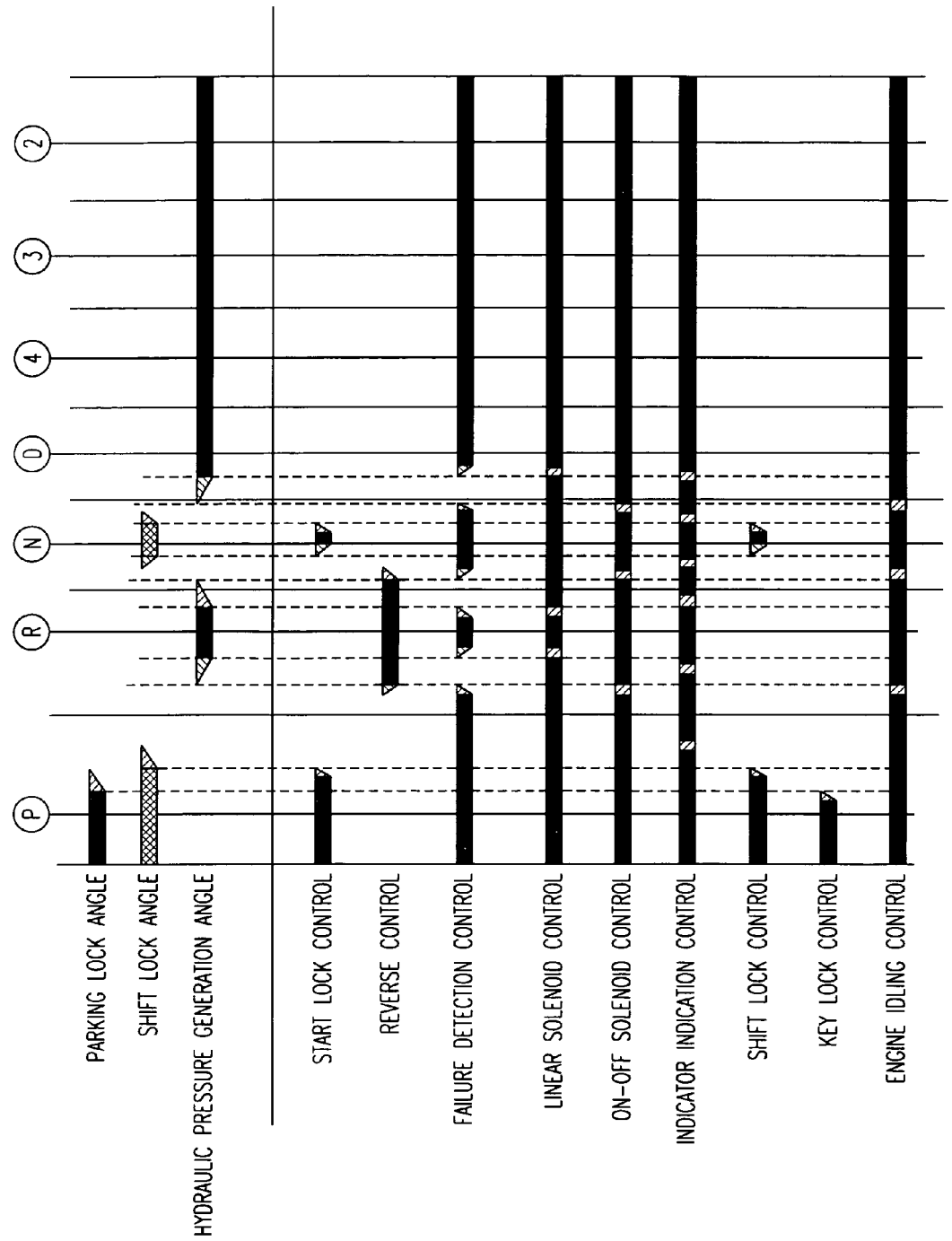
FIG. 4 illustrates range patterns utilized in the first embodiment of the present invention.

FIG. 4 shows the manner in which the aforementioned limits are set in the first embodiment of the present invention.

Referring to FIG. 4, end regions of the horizontal bars having variable widths are set in consideration of the variation in the detecting precision of the sensor 14 (FIG. 1) variation in the precision of members involved in the control operations of the automatic transmission and the vehicle, the variation in the precision of mounting components of the automatic transmission and the vehicle, variation in hydraulic pressure, and variations in the automatic transmission control unit 15 and the like. For example, these variations may result from temperature characteristics of a hold IC of the sensor 14, errors in software of the automatic transmission control unit 15, errors in hardware of the automatic transmission control unit 15, the inclination of the mounting of the sensor 14, the inclination of the manual shaft 3, and the like. The regions indicated by the horizontal bars are set to allow for the foregoing. In regions in FIG. 4 where a bar has a constant width, the ranges are always set regardless of the variations mentioned above.

As shown in FIG. 4, the range limits for the control operations (below the horizontal line) in the first embodiment are determined on the basis of characteristics inherent to the system as installed in a vehicle, i.e., the ranges for parking lock angle in the parking range, shift lock angle in the parking range, and hydraulic pressure generation angle of the transmission (the ranges above the horizontal line). The terminology "hydraulic pressure generation angle" as used herein has reference to the angular position of the manual shaft 13 which, in turn, governs stroke of the manual valve 33. A parking lock angle is the angle whereas parking gear and a parking pole of the transmission mechanically mesh with each other to lock the wheels, so that the vehicle is prevented from moving. The parking pole is mechanically coupled to and interlocked with the detent 31. The range for shift lock angle utilized in limit determination is that range where the shift lever 21 is mechanically locked. When the shift lever 21 is locked, no range pressure is generated.

In start lock control, the limits for the parking range are set within the range of variation of a reliable shift lock. Thus, within the limits for the parking range determined by the automatic transmission control unit 15 during start lock control, the vehicle is prevented from starting in motion as the starter motor is driven to start the engine. The limits for the parking range during start lock control can also be set within a range where no hydraulic pressure (range pressure) is generated within the transmission, taking into account the aforementioned variation. In this case, the parking range where generation of a hydraulic pressure in the transmission is reliably prevented is wider than the shift lock range. Therefore, the limits can be set more widely apart in comparison with the range set for the shift lock angle.

The limits for the neutral range in start lock control are set to define a range where generation of a hydraulic pressure in the transmission is reliably prevented, taking into account the aforementioned variation. Thus, when the automatic transmission control unit 15 determines the neutral range during start lock control, the vehicle is prevented from starting in motion unexpectedly as the starter motor is driven.

The limits for the parking range in shift lock control are set to define a range where the shift lock is reliably set, taking into account the aforementioned variation, and wherein generation of a hydraulic pressure in the transmission is reliably prevented. Thus, when the automatic transmission control unit 15 determines selection of the parking range, during shift lock control, the vehicle is prevented from starting in motion unexpectedly as the starter motor is driven to start the engine.

The limits for the neutral range for shift lock control are set within a range where generation of a hydraulic pressure in the transmission is reliably prevented, taking into account the aforementioned variation. Thus, when the automatic transmission control unit 15 determines the neutral range during shift lock control, the vehicle is prevented from starting in motion unexpectedly.

The limits for the parking range in key lock control are set within a range where a parking lock angle is reliably set, taking into account the aforementioned variations. Thus, the range where the parking gear is locked is set as a key lock release range, and the key is allowed to be removed only in the key lock release range. Accordingly, the key is prevented from being removed, for example, while the vehicle is driven.

In linear solenoid control, the limits for each of the driving ranges, namely, the reverse range, the drive range, the fourth-speed range, the third-speed range, and the second-speed range are set as ranges whereas hydraulic pressure in the transmission is reliably generated, taking into account the aforementioned variation. Thus, attempted regulation of a pressure by the linear solenoid valve without hydraulic pressure present is prevented. When a shift is made from a non-driving range, such as the parking range or the neutral range, to one of the aforementioned driving ranges, the vehicle can be reliably started in motion without delay. If necessary, the limits for a driving range, such as the drive range or the reverse range, can also be set within a hydraulic pressure generation range including a range of variation.

The limits for a non-driving range, such as the parking range or the neutral range, during linear solenoid control are so set as to continuously change from the non-driving range to a driving range, taking into consideration the aforementioned variation.

Furthermore, in on-off solenoid control, the limits for each of the driving ranges, namely, the reverse range, the drive range, the fourth-speed range, the third-speed range, and the second-speed range are set as ranges where generation of a hydraulic pressure in the transmission is reliably prevented, with regard for the aforementioned variation. Thus, when a hydraulic pressure is generated, the on-off solenoid is prevented from opening unexpectedly. As a result, no shock is received by the linear solenoid valve, by the hydraulic servos or by the like due to abrupt delivery of the hydraulic pressure to those components.

The limits for a non-driving range, such as the parking range or the neutral range, during on-off solenoid control are so set as to continuously change from the non-driving range to a driving range, taking into consideration the aforementioned variation.

Moreover, in failure detection control, the limits for each of the driving ranges, namely, the reverse range, the drive range, the fourth-speed range, the third-speed range, and the second-speed range, are set as ranges where a hydraulic pressure in the transmission is reliably generated regardless of the variation. The limits for a non-driving range, such as the parking range or the neutral range, are set as ranges where generation of a hydraulic pressure in the transmission is reliably prevented allowing for the aforementioned variation Thus, erroneous detection of an error in the automatic transmission (a mechanical error in-the automatic transmission) can be prevented.

In reverse lamp lighting control, the limits for the reverse range are set outside a range where a hydraulic-pressure in the transmission is generated, again taking into account variations. Thus, the reverse lamp is reliably lit to inform others outside the vehicle before the reverse range is set in the transmission.

In the first embodiment, the limits for the reverse range during reverse inhibition control are set equal to the limits the reverse range during reverse lamp lighting control. In reverse inhibition control mentioned above, if a signal is in the voltage value range for the reverse range with the vehicle running at a speed equal to or higher than a predetermined speed, the above-mentioned reverse inhibition control is performed to prevent a shift into reverse.

In addition, the limits for the parking range, the reverse range, the neutral range, the drive range, the fourth-speed range, the third-speed range, and the second-speed range during indicator control are set in consideration of shakiness of the shift lever 21 and the like. In view of such "shakiness", etc., the limits are set so as to be laterally symmetrical with respect to a notch of the detent 31 (which ensures the positioning of the shift lever 21 by the detent 31).

In engine idling control, the limits for each of the non-driving ranges, namely, the parking range and the neutral range, are set to define ranges where generation of a hydraulic pressure in the transmission is reliably prevented, again taking into account the aforementioned variation. In this manner, the idling speed in the parking range and in the neutral range is reduced to reduce the amount of fuel injection and to thereby improve (reduce) fuel consumption.

The limits for a driving range, such as the reverse range, the drive range, the fourth-speed range, the third-speed range, and the second-speed range, during engine idling control are set so as to provide a continuous change from a non-driving range to a driving range and to become wider apart toward the driving range, in consideration of the aforementioned variation. Thus, when a shift from a non-driving range to a driving range is made, the shift to the driving range is noticed at an early stage and the engine speed is raised as soon as possible.

Figure 5:
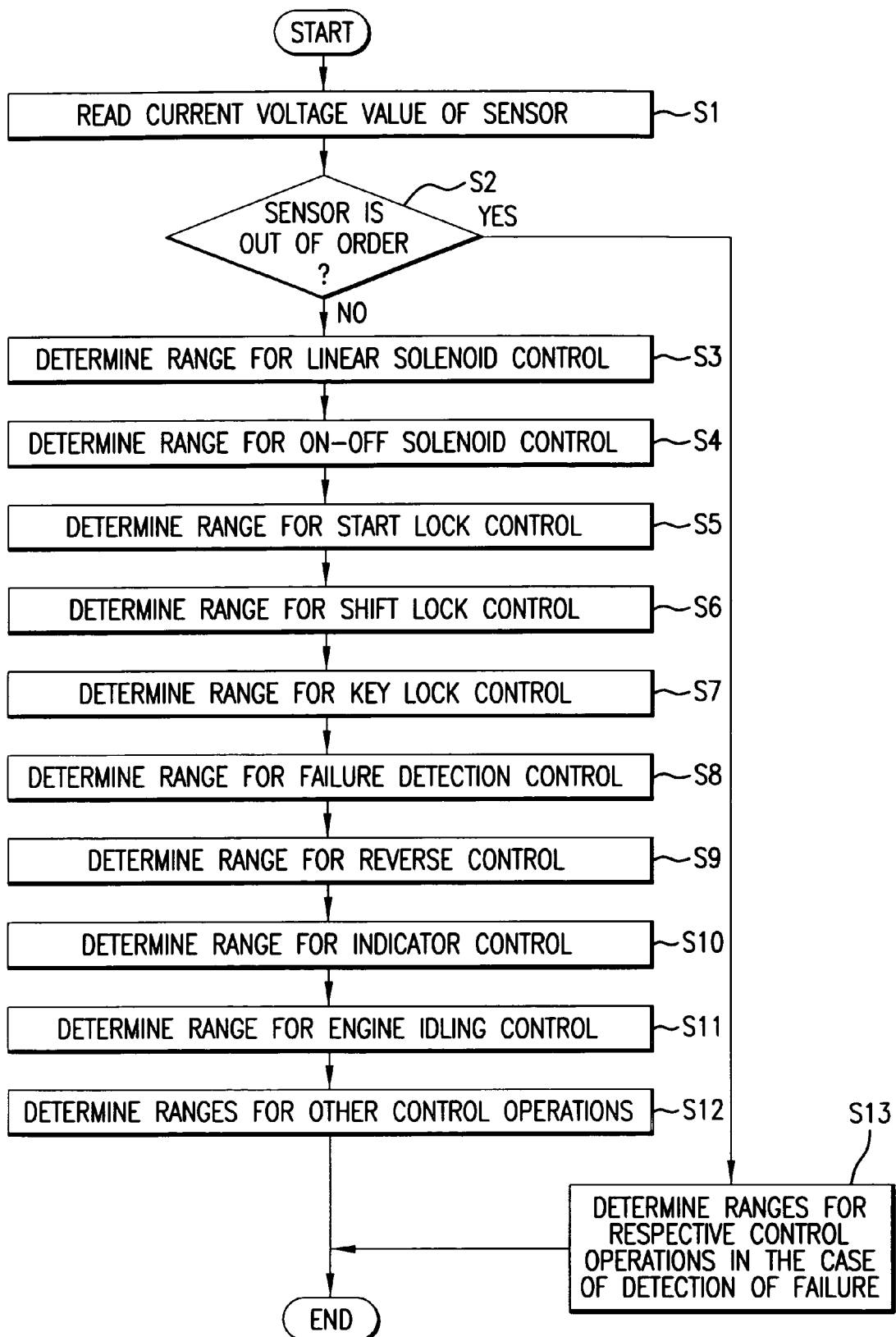
FIG. 5 is a flowchart of a limit (threshold) setting routine for forming the range patterns of FIG. 4, in accordance with the first embodiment of the present invention.

Next, operation of a limit setting routine executed by a limit setting processing means (not shown) of the automatic transmission control unit 15 will be described. FIG. 5 is a flowchart of the routine for setting limits (thresholds) for each of the ranges in the first embodiment of the present invention, i.e., for setting the range determination patterns shown below the horizontal line in FIG. 4.

In the routine of FIG. 5, the limit setting processing means, in executing the limit setting routine, first reads a current voltage value of the signal from sensor 14 (step S1), and determines on the basis of the voltage value whether or not the sensor 14 is functioning properly (step S2). If the sensor 14 is found to be functioning properly, the limit setting processing means sets limits for ranges for each of the control operations.

That is, in step S3 limits for linear solenoid control are set, as described above, for each of the parking range, the reverse range, the neutral range, the drive range, the fourth-speed range, the third-speed range, and the second-speed range are set by the setting processing means and recorded in memory 44 of the automatic transmission control unit 15.

Next, in step S4 limits for on-off solenoid control are set for each of the parking range, the reverse range, the neutral range, the drive range, the fourth-speed range, the third, speed range, and the second-speed range, and are also recorded in the memory 44 of the automatic transmission control unit 15.

Next, limits for start lock control are set in step S5, as described above, for the, parking range and the neutral range and are recorded in the memory 44 of the automatic transmission control unit 15.

Next, in step S6 limits for shift lock control are set, as described above, for the parking range and the neutral range and are recorded in the memory 44 of the automatic transmission control unit 15.

Then, in step S7 limits for key lock control are set for only the parking range by the limit setting processing means which records the set limits in the memory 44 of the automatic transmission control unit 15.

Next, limits for failure detection control are set in step S8, as described above, for the parking range, the reverse range, the neutral range, the drive range, the fourth-speed range, the third-speed range, and the second-speed range by the limit setting processing means which then records them in the memory 44 of the automatic transmission control unit 15.

Next, in step S9 limits for reverse control are set for only the reverse range by the limit setting processing means which records them in the memory 44 of the automatic transmission control unit 15.

Then, limits for indicator control are set in step S10, as described above, for the parking range, the reverse range, the neutral range, the drive range, the fourth-speed range, the third-speed range, and the second-speed range by the limit setting processing means which then records them in the memory 44 of the automatic transmission control unit 15.

Next, limits for engine idling control are set in step S11 for the parking range, the reverse range, the neutral range, the drive range, the fourth-speed range, the third-speed range, and the second-speed range by the limit setting processing means and are then recorded in the memory 44 of the automatic transmission control unit 15.

In addition, limits for range patterns for other control operations (which were omitted from the description of the first embodiment) are set. Thresholds for ranges to be set for those control operations are recorded in the memory 44 of the automatic transmission control unit 15. After the thresholds for the respective control operations have thus been set, the processing is terminated.

If the sensor 14 is out of order, ranges for the respective control operations in the case of detection of a failure are set. In this case, the limits are so set as to represent voltage value ranges on the safe side.

Thus, in the first embodiment, a voltage value of the signal output by the sensor 14 is compared with the range determination pattern arbitrarily set for each of the control operations, and a range is independently determined for each control operation. Therefore, optimal range information can be obtained for each of the control operations and each of the control operations can be appropriately executed.

Each of the-control operations corresponds to one of a plurality of components to be controlled and, therefore, each of the control operations can be performed as appropriate for each one of the components.

The sensor 14 generates a linear voltage value on the basis of the driver's operation of the shift lever 21. Therefore, a range can be determined easily and precisely.

The non-contact sensor 14 detects extent of movement of the shift lever 21. Because the sensor 14, is a non-contact type, it is not likely to wear out or deteriorate with age, and can generate stable outputs over a long period of time.

By setting at least two range determination patterns in common for at least one of the components to be controlled, several control operations can be performed appropriately by using that common range information. For example, common range information can be obtained for the respective control operations performed as to the automatic transmission. Alternatively, common range information can be obtained for the respective control operations performed for the automatic transmission, start lock control performed for the engine, and reverse control performed for the transmission.

Figure 6:
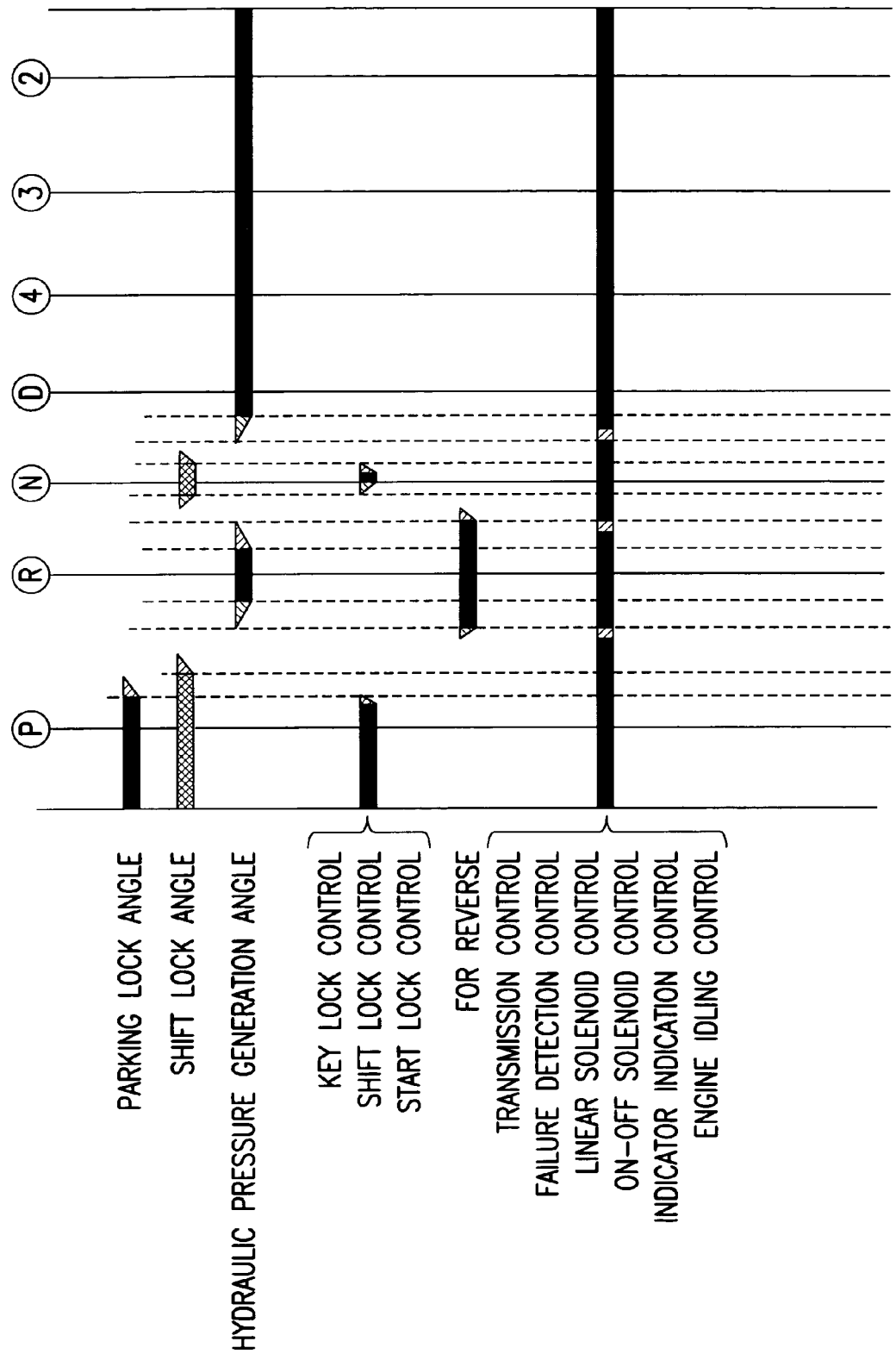
FIG. 6 illustrates range patterns utilized in a second embodiment of the present invention.

FIG. 6 shows setting of the limits in the second embodiment of the present invention.

In this second embodiment, the controls executed mainly in connection with the various operations of the automatic transmission, namely, failure detection control, linear solenoid control, on-off solenoid control, indicator indication control, and influence on engine idling control are referred to as transmission control operations. A common range determination pattern may be set for all such transmission control operations.

The third embodiment of the present invention will now be described with reference to FIG. 7. Components identical in structure with those of the first embodiment are denoted by the same reference symbols and will not be described again. Of course, the function and effect of structure identical to that of the first embodiment are the same.

Figure 7:
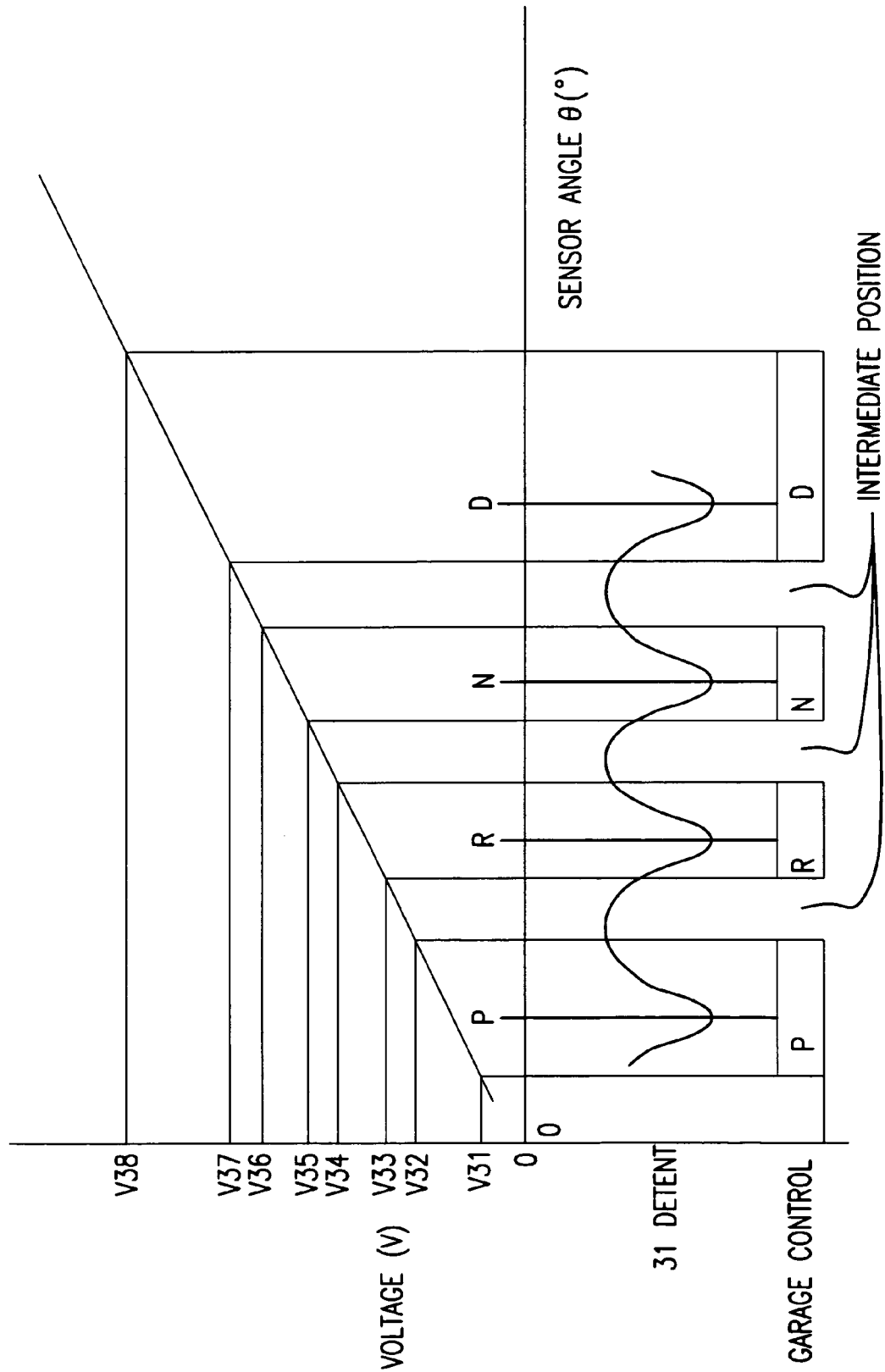
FIG. 7 shows ranges for garage control and voltage values of the sensor in a third embodiment of the present invention.

FIG. 7 shows ranges for garage control and voltage values of the signal of the sensor in the third embodiment of the present invention.

Referring to FIG. 7, the limits Vi(i=31, 32, . . . , 38) increase as the value "i" increases, and decrease as the value "i" decreases. The limits Vi for each of the control operations are no more than examples and can be set arbitrarily. In the third embodiment, for convenience of explanation, a voltage value range between two limits Vi such as limits Vm and Vm+1 is referred to as the range Vm–Vm+1. In fact, however, this means equal to or larger than the limit Vm and smaller than the limit Vm+1.

As shown in FIG. 7, in the range determination apparatus 11 (FIG. 1) of the third embodiment, the parking range, the reverse range, the neutral range, and the drive range are set as ranges for garage control. Although the fourth-speed range, the third-speed range, and the second-speed range are not described for the third embodiment, they may also be set as described above. The ranges for garage control are set as follows.

A voltage value range of the limits V31–V32 is set as the parking range in garage control. If a voltage value of the signal output from the sensor 14 during garage control is within the voltage value range of V31–V32, the range determination processing means 42 determines that the parking range has been selected in garage control, and sets the automatic transmission in the parking range for garage control.

A voltage value defined as V33–V34 is set as the reverse range in garage control. If a voltage value of the signal output from the sensor 14 during garage control is within the voltage value range of the limits V33–V34, the range determination processing means 42 determines the reverse range in garage control, and sets the automatic transmission in the reverse range for garage control.

A voltage value range of V35–V36 is set as the neutral range in garage control. If the voltage value of the signal output from the sensor 14 during garage control is within the voltage value range of V35–V36, the range determination processing means 42 determines the neutral range in garage control, and sets the automatic transmission in the neutral range for garage control.

A voltage value range of V37–V38 is set as the drive range in garage control. If a voltage value of a signal output from the sensor 14 during garage control is within the voltage value range of V37–V38, the range determination processing means 42 determines the drive range in garage control, and sets the automatic transmission in the drive range for garage control.

In the third embodiment, first to third intermediate position ranges, where no determination of range is made, are set between the parking range and the reverse range, between the reverse range and the neutral range, and between the neutral range and the drive range, respectively. The first to third intermediate position ranges are set with voltage value ranges of V32–V33, V34–V35, and V36–V37, respectively.

The same ranges as in FIG. 2 are also set for start lock control, shift failure detection control, reverse control, shift lock control, key lock control, and engine idling control. The limits used to determine a range are set independently for each of the control operations.

The range determination apparatus 11 of the third embodiment, as described above, performs automatic transmission control, engine control, and indicator control by utilizing the first to third intermediate position ranges set as ranges for garage control.

Figure 8:
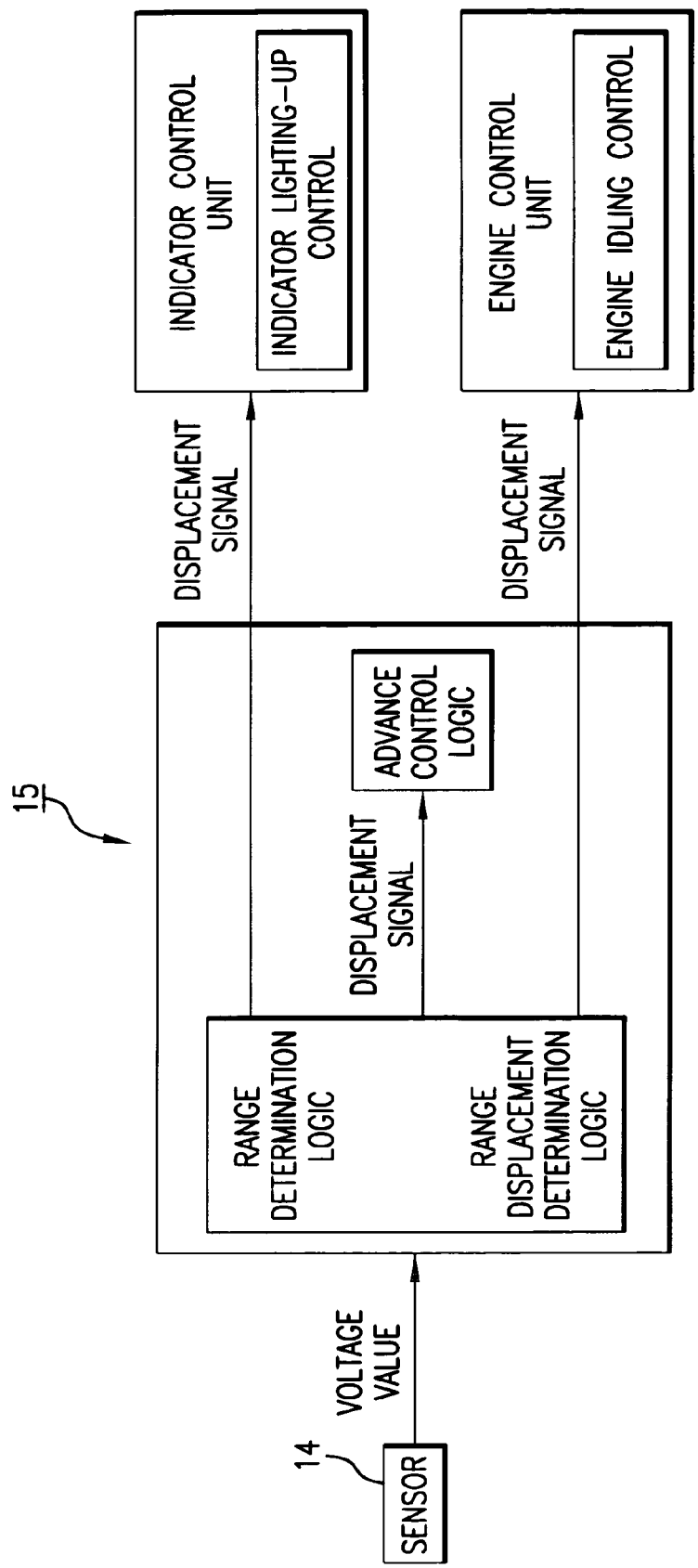
FIG. 8 is a block diagram of advance control in the third embodiment of the present invention.

FIG. 8 is a block diagram illustrating advance control in the third embodiment of the present invention.

As shown in FIG. 8, a range determination logic for determining a range, a range displacement determination logic, and an advance control logic for garage hydraulic pressure control are stored in the memory 44 of the automatic transmission control unit 15.

As described above, the range determination logic is designed to determine a range for each component control operation, for example, automatic transmission control, engine control and the like, namely, to determine a range pattern independently for each of garage control, start lock control, shift lock control, key lock control, failure detection control, reverse inhibition control, and the like. The range displacement determination logic is designed to determine that the range has been changed from one range to a next adjacent range in the first, second, or third intermediate position ranges for garage control. The advance control logic for garage hydraulic pressure control is designed to execute hydraulic pressure control responsive to initiation of movement of the shift lever 21 (FIG. 1) to another (new) range, before the shift-lever 21 reaches the position corresponding to the new range.

If the automatic transmission control unit 15 determines that a voltage value is in one of the first, second, or third intermediate position ranges, the range displacement (movement) determination processing means (not shown) executes a range displacement determination routine in which it determines, through the range displacement determination logic, from which range to which range the shift lever. 21 is being moved, and generates and outputs a range displacement signal.

The advance control processing means (not shown) of the automatic transmission control unit 15 executes an advance control routine, through the advance control logic, on the basis of the range displacement signal during garage control of the automatic transmission. In engine control, a range displacement signal is output from the automatic transmission control unit 15 to the engine control unit or the like via a communication line such as a CAN or the like. The engine control processing means of the engine control unit then executes an engine control routine. For instance, the engine control processing means performs an engine operation such as engine idling by controlling the amount of fuel injection.

A shift displacement (shift lever movement) signal is output from the automatic transmission control unit 15 to the indicator control unit via a communication line such as a CAN or the like. A notification processing means (not shown) of the indicator control unit executes a notification routine, performs an indicator control operation such as turning a indicator light on/off to notify the driver that the shift lever 21 is being moved from one range to another.

Figure 9:
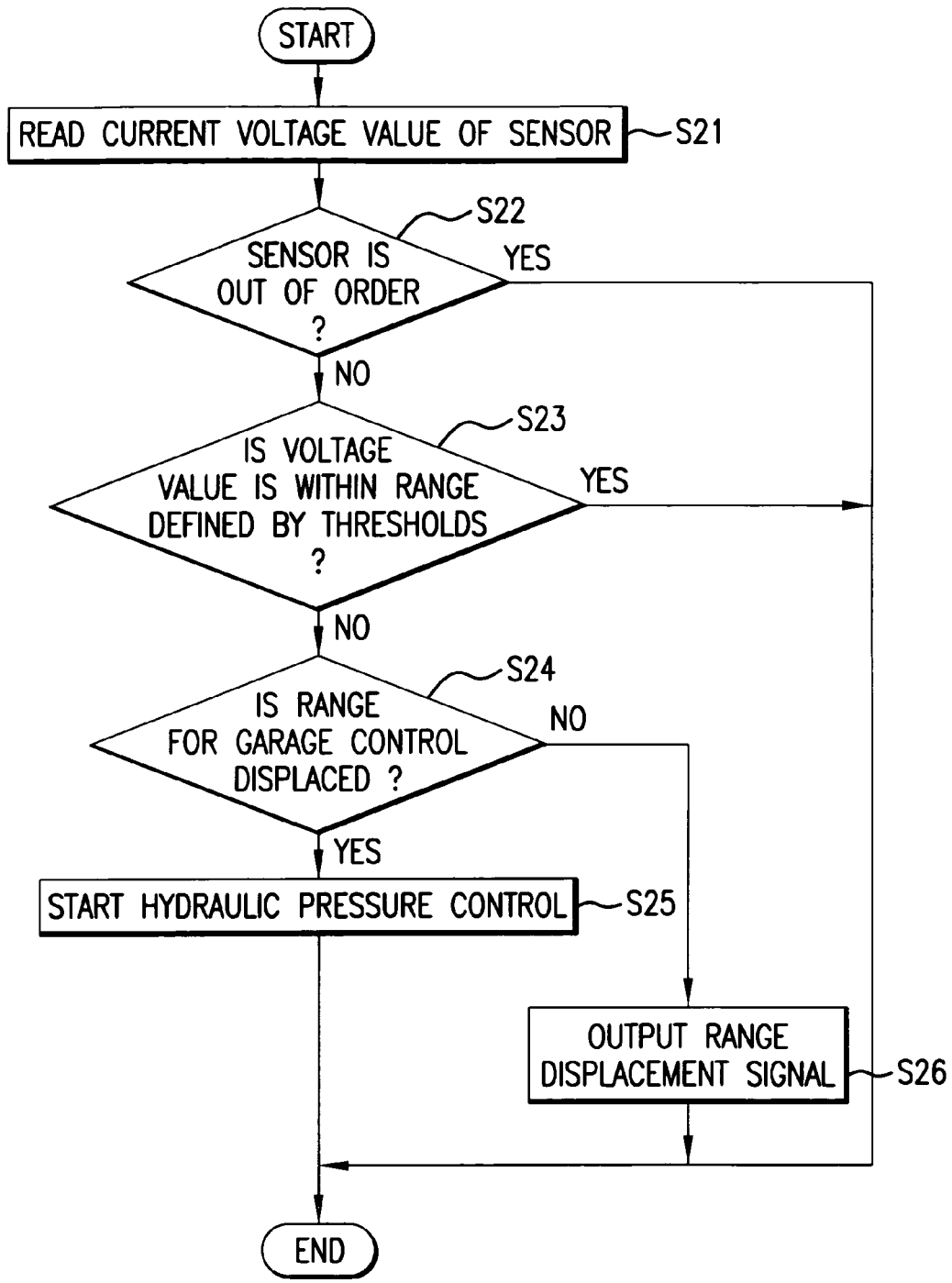
FIG. 9 is a flowchart of a routine for operation of an automatic transmission control unit in the third embodiment of the present invention.

Next, operation of the automatic transmission control unit 15 will be described with reference to FIG. 9 which is a flowchart showing operation of the automatic transmission control unit in the third embodiment of the present invention.

Firstly, the automatic transmission control unit 15 (FIG. 1) reads the current voltage value of the signal of the sensor 14 (step S21), and determines on the basis of the voltage value whether or not the sensor 14 is functioning properly (step S22). If the sensor 14 is operating properly, a voltage value determination processing means (not shown) of the automatic transmission control unit 15 executes a voltage value determination routine, and determines whether or not the voltage value is within a preset range (region) defined by limits for each of the ranges (step S23).

On the other hand, if the voltage value is not within the aforementioned range defined by the limits, the range determination processing means 42 executes a range displacement determination routine, determines that movement of the shift lever has been initiated, and determines whether or not the shift lever movement is for garage control (step S24).

If the shift lever movement is for garage control, the advance control processing means performs advance control on the basis of the range displacement signal during garage control of the automatic transmission. That is, before the shift lever 21 reaches the new range, garage hydraulic pressure control-for that range is started (step S25). If the range change is for control of an operation other than garage control, namely, a range displacement for engine control, a range displacement signal is output to the control unit of the engine, so that engine control is performed. If the range displacement is a displacement for indicator control, a range displacement signal is output to the control unit of the indicator to light (turn ON) the indicator.

Thus, in the third embodiment, while the shift lever 21 is being moved from one range to another, a control operation for the range to be set subsequently can be performed as advance control. Therefore, gearshift shock can be effectively suppressed by reducing the frequency of control delay, for example, during garage control.

Likewise, operations for control of other components can be optimized by reducing the frequency of control delay.

In the aforementioned respective embodiments, a voltage value of the signal of the sensor 14 is transmitted to the automatic transmission control unit 15, which determines a range on the basis of the voltage value. However, alternatively; the sensor 14 may have the capability of determining a range, of transmitting the result of the determination (a determined range) to the automatic transmission control unit 15, and sending range information or a control signal based on the determined range to the components to be controlled by the automatic transmission control unit 5. Moreover, if the sensor 14 possesses the function of determining a range, the result of the determination can be sent from the sensor 14 directly to the components to be controlled, without the intervention of the automatic transmission control unit 15.

In the aforementioned respective embodiments, the automatic transmission has been described as a staged transmission. However, the present invention is also applicable to other transmissions including a continuously variable transmission and the like.

In addition, it is not absolutely required that the ranges be set as in the aforementioned embodiments. That is, the ranges can be set arbitrarily. Likewise, it is not absolutely required either that the limits serving as criteria for determining a range be set as in the aforementioned embodiments. That is, the operations may also be set arbitrarily.

In the respective embodiments described, ranges are determined in accordance with a signal generated by the driver's operation of the shift lever 21. However, alternatively, the signal utilized may be generated by the driver's operation of a push button as a shift operation which starts a motor to operate the manual valve. In other words, the present invention is also applicable to shift-by-wire systems and the like.

In the foregoing embodiments, the apparatus of the invention has been described as applied to a drive train including a staged automatic transmission. However, the present invention may be applied to an electric drive unit utilizing a drive motor as a drive source, an electric drive unit having a drive motor, an engine and a generator as drive sources, and the like wherein control of locking or allowing operation of the starter motor is provided for the neutral range, and wherein control allowing reverse driving of the drive motor or lighting of the reverse lamp is provided for the reverse range.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A range determination apparatus comprising:
a sensor that generates a continuous output value in response to operation of a shift operation member in a power train; and
range determination processing means for comparing the output value with range determination patterns set for each of plural control operations and for determining a range independently for each of the control operations.

2. The range determination apparatus according to claim 1, wherein
the continuous output is one analog signal.

3. The range determination apparatus according to claim 2, wherein
a range determination pattern is shared in common for at least two control operations of at least one component to be controlled.

4. The range determination apparatus according to claim 1, further comprising:
control processing means for executing the control operations for a plurality of components to be controlled.

5. The range determination apparatus according to claim 1, wherein
different range determination patterns are respectively set for plural control operations.

6. The range determination apparatus according to claim 5, wherein
an additional range determination pattern is shared in common for at least two transmission control operations.

7. The range determination apparatus according to claim 6, wherein
the range determination pattern that is shared in common by the at least two transmission control operations is set on the basis of a range pressure, and
the at least two control operations are two of: failure detection control, linear solenoid control, on-off solenoid control, and indicator control.

8. The range determination apparatus according to claim 1, wherein
the range determination patterns are set in consideration of variations in range pressure angle, parking lock angle, and shift lock angle.

9. The range determination apparatus according to claim 1, wherein
the sensor generates a linear output value corresponding to driver's operation of the shift operation member.

10. The sensor determination apparatus according to claim 1, wherein
the sensor detects movement of the shift operation member, is a non-contact sensor, and generates the output value as a voltage value.

11. The range determination apparatus according to claim 1, wherein
the range determination patterns are combinations of limits expressed as output values.

12. The range determination apparatus according to claim 11, wherein
the limits are for range pressures generated by operating the shift operation member in linear solenoid control of the transmission.

13. The range determination apparatus according to claim 11, wherein
the limits are for range pressures generated by operating the shift operation member in on-off solenoid control of the transmission.

14. The range determination apparatus according to claim 11, wherein
the limits are for range pressures generated by operating the shift operation member in start lock control of the engine.

15. The range determination apparatus according to claim 11, wherein
the limits are for range pressures generated by operating the shift operation member in shift lock control of the transmission.

16. The range determination apparatus according to claim 11, wherein
the limits are for parking lock angles in key lock control of a vehicle.

17. The range determination apparatus according to claim 11, wherein
the limits are for range pressures generated by operating the shift operation member in failure detection control of the transmission.

18. The range determination apparatus according to claim 11, wherein
the limits are for range pressures generated by operating the shift operation member in reverse control of the transmission.

19. The range determination apparatus according to claim 11, wherein
the limits are for range pressures generated by operating the shift operation member in engine idling control of the transmission or of the engine.

20. The range determination apparatus according to claim 11, wherein
limits are set for a plurality of ranges in each range determination pattern and wherein, an intermediate position range is set between adjacent ranges, and
advance control means, responsive to movement of the shift operation member to the intermediate position range, performs advance control for a range to be subsequently set.

21. A range determination method comprising the steps of:
comparing a value of continuous output generated by a sensor, in response to operation of a shift operation member, with range determination patterns preset for each of plural control operations; and
determining a range for each of the control operations in accordance with results of said comparing.

22. The range determination method according to claim 21 wherein the plural range determination patterns include at least two different range determination patterns.

23. The range determination method of claim 21 wherein the plural range determination patterns include a range determination pattern shared in common by at least two different control operations.

24. A machine readable medium having encoded thereon a program for a range determination method, said method comprising:
comparing a value of continuous output generated by a sensor, in response to operation of a shift operation member, with range determination patterns preset for each of plural control operations; and
determining a range for each of the control operations in accordance with results of said comparing.

25. A machine-readable medium having encoded thereon a program for a range determination whereby a computer, which is included in a range determination apparatus comprising a sensor that generates a continuous output value in response to operation of a shift operation member, is caused to function as range determination processing means for comparing the output value with range determination patterns set independently for each of plural control operations and for determining a range for each of the control operations on the basis of the results of the comparing.

* * * * *